United States Patent
Bozso et al.

[19]

[11] Patent Number: 6,014,036
[45] Date of Patent: Jan. 11, 2000

[54] BIDIRECTIONAL DATA TRANSFER PATH HAVING INCREASED BANDWIDTH

[75] Inventors: Ferenc Miklos Bozso, Fairfield; Philip George Emma, Danbury, both of Conn.; William Robert Reohr, Bronx, N.Y.

[73] Assignee: International Business Machines Corporation, Armonk, N.Y.

[21] Appl. No.: 08/975,368

[22] Filed: Nov. 20, 1997

[51] Int. Cl.⁷ .............................................. H03K 19/0175
[52] U.S. Cl. ........................... 326/21; 326/82; 326/86; 710/130; 370/447; 370/461
[58] Field of Search .................. 326/21, 30, 82, 326/86, 90, 56; 710/130; 370/446–447, 461–462

[56] References Cited

U.S. PATENT DOCUMENTS

| | | |
|---|---|---|
| 4,375,078 | 2/1983 | Thoma . |
| 4,396,995 | 8/1983 | Grau . |
| 4,419,592 | 12/1983 | Norgren et al. . |
| 4,639,861 | 1/1987 | Appiano et al. . |
| 4,972,432 | 11/1990 | Wilson et al. . |
| 4,999,769 | 3/1991 | Costes et al. . |
| 5,150,359 | 9/1992 | Wilson et al. . |
| 5,371,863 | 12/1994 | Silver ....................................... 370/130 |
| 5,592,509 | 1/1997 | McClear et al. ........................... 326/30 |
| 5,604,450 | 2/1997 | Borkar et al. .............................. 326/82 |
| 5,923,187 | 7/1999 | Maugars .................................... 326/86 |

*Primary Examiner*—Jon Santamauro
*Attorney, Agent, or Firm*—F. Chau & Associates, LLP

[57] ABSTRACT

A circuit for bidirectionally exchanging data includes a plurality of entities electrically connected therebetween by a bus, the plurality of entities for sending and receiving data to each other. An at least one swapper circuit is electrically connected to the bus at a connection point between the plurality of entities. The at least one swapper circuit includes circuitry for timing data transfer between a send data mode and a receive data mode and sending and receiving data during the respective modes. The at least one swapper circuit includes a routing device for receiving data simultaneously from the plurality of entities and then sending data simultaneously to the plurality of entities without colliding data.

30 Claims, 15 Drawing Sheets

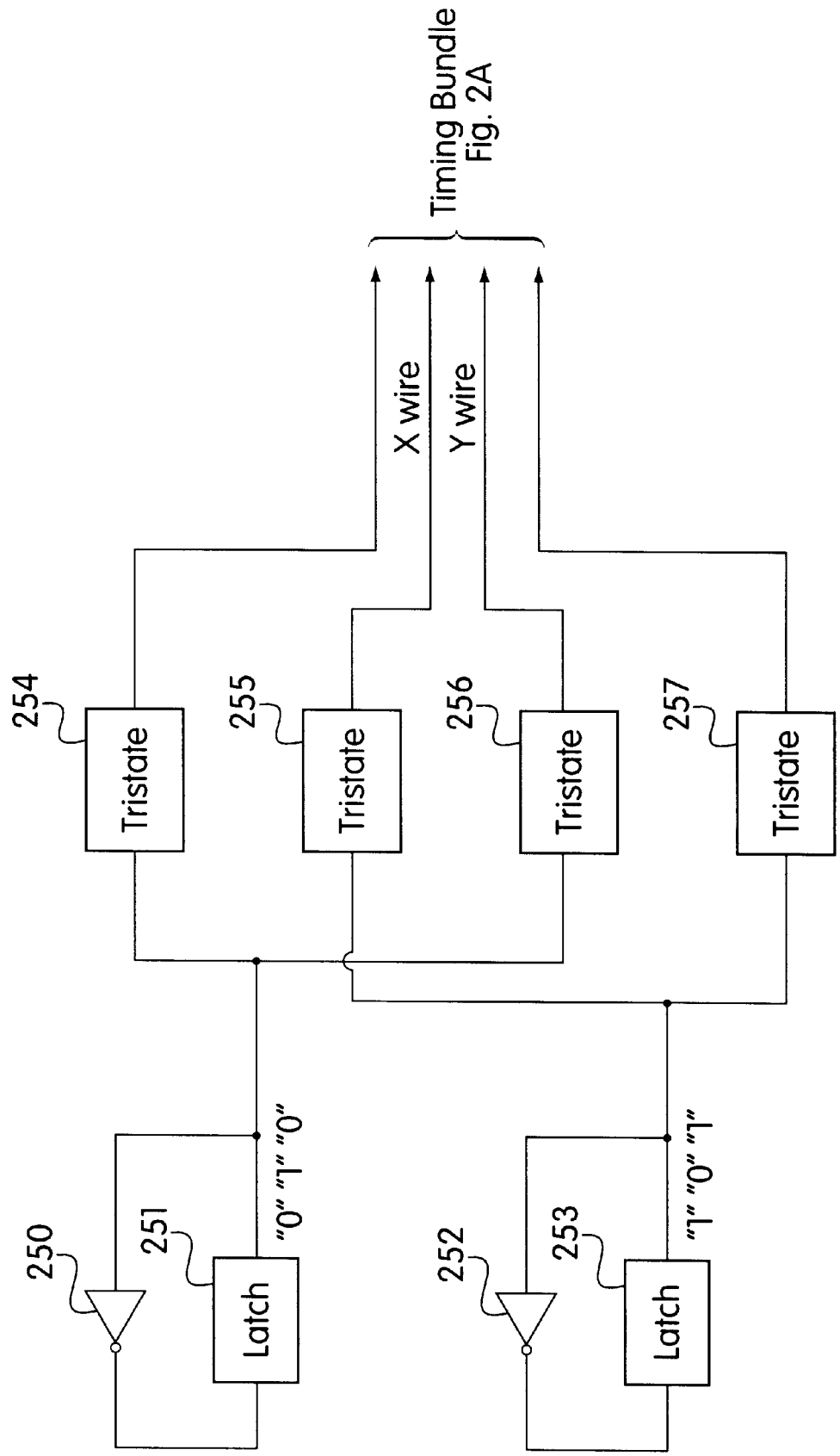

BIDIRECTIONAL DATA TRANSFER PATH HAVING INCREASED BANDWIDTH

BACKGROUND OF THE INVENTION

1. Field of the Invention

This disclosure relates to a data path circuit and method and, more particularly, to a circuit for bidirectional data transfer for increasing a bandwidth of information exchanged between a plurality of entities.

2. Description of the Related Art

Metal interconnect adds significantly to the cost of VLSI circuits. Wiring resources are constrained either by the cost of additional wiring levels or by the improvements in process and lithography required to increase wiring density. One way to better utilize the scarce wiring resource is to share bus wires between macros. For chip to chip communications, a prior art approach described in U.S. Pat. No. 5,604,450 by Borkar et al. achieves bidirectional signaling by employing a ternary encoding scheme. While this scheme may achieve higher throughput at the board level, it comes at great expense to be deployed for chip (unit/macro) level wire interconnect. A more satisfactory solution is desirable which neither degrades signal noise margin nor consumes DC power.

A shared bus, or what is called a tristate bus, enables more than one sending entity to control the state of the bus. Unfortunately, in most tristate bus schemes, a signal wire can only transfer one bit of information each cycle. Each sending entity must time share a bus with the other sending entities using that same bus, otherwise, logic conflicts would arise between a driver trying to pull a net low to a "0" and another trying to pull the same net high to a "1". Hence in all the above mentioned schemes, only one driver can be active during any given cycle; the other drivers attached to the net are put into a high impedance state. While a shared bus scheme may save wiring resources, it does not increase the potential throughput, or bandwidth, of the bus. To achieve improved bandwidth, the bus must be time shared over a single cycle.

Therefore, a need exists for a circuit, which could be inserted near the center of a bus for exchanging data on bus wires connecting two or more entities in such a way that two waves of data, moving in opposite directions, may simultaneously exist on the bus without colliding data.

SUMMARY

A circuit for bidirectionally exchanging data includes a plurality of entities electrically connected therebetween by a bus, the plurality of entities for sending and receiving data to each other. An at least one swapper circuit is electrically connected to the bus at a connection point between the plurality of entities. The at least one swapper circuit includes means for timing data transfer between a send data mode and a receive data mode and sending and receiving data during the respective modes. The at least one swapper circuit may include a routing means for receiving data simultaneously from the plurality of entities and then sending data simultaneously to the plurality of entities without colliding data. An entity timing means for each of the plurality of entities may be electrically connected to the at least one swapper circuit for propagating timing signals to the at least one swapper circuit to enable the send data mode and the receive data mode within the at least one swapper circuit to correspond with a receive data mode and a send data mode, respectively, for each entity. The timing signals may be asynchronous and timed by each of the plurality of entities. A timing means for data transfer and the entity timing means for propagating timing signals may be synchronized by a global clock signal provided thereto by a global clock. The timing signals may be propagated on at least four adjacent wires such that each wire has a timing signal opposite in polarity to the wires adjacent thereto and two internal wires have more capacitive coupling than the other wires for representing a slowest signal on the bus.

The circuit for bidirectionally exchanging data may also have the at least one swapper circuit located at a substantially equal distance along the bus from each of the plurality of entities. The plurality of entities may be components on a semiconductor device. The at least one swapper circuit may include multiple inputs for exchanging data between multiple busses. An output of the at least one swapper may be connected to one of the multiple inputs to turn the at least one swapper circuit off if no data is being transferred. The at least one swapper may include an at least one tristate driver which is switched between an active mode and a high impedance mode corresponding to the send data mode and the receive data mode of the at least one swapper. Each of the plurality of entities may include a unidirectional tristate driver cooperating with at least one latch and a timing signal generated from a global clock to sequence send data modes and receive data modes by each of the plurality of entities.

The circuit for bidirectionally exchanging data may have the at least one swapper connect to at least one bidirectional repeater for decreasing signal delay and removing noise from the bus. The at least one bidirectional repeater may include two tristate drivers, each driver having an output connected to an input of the other such that signals are driven in only one direction at a time during a predetermined period of time. The data transferred by the tristate busses may be binary signals, analog signals, differential signals or N-state signals.

A circuit for bidirectionally exchanging data includes a plurality of entities electrically connected therebetween by a plurality of buses, the plurality of entities for sending and receiving data to each other, an at least one swapper circuit electrically connected to the bus at a connection point between the plurality of entities, the at least one swapper circuit including means for timing data transfer between a send data mode and a receive data mode, an at least one multiplexor connecting to the plurality of busses and to the at least one swapper for receiving data from the plurality of entities on one bus and for sending data through another bus to the plurality of entities, entity timing means for each of the plurality of entities electrically connecting to the at least one swapper circuit for propagating timing signals to the at least one swapper circuit to enable the send data mode and the receive data mode within the at least one swapper circuit to correspond with a receive data mode and a send data mode, respectively, for each entity and the at least one swapper circuit including a routing means for receiving data simultaneously from the plurality of entities and then sending data simultaneously to the plurality of entities without colliding data.

The multiplexor may include a plurality of legs, each leg further including a pair of NFETs. An arbitration circuit may be electrically connected to arbitration latches for exchanging information among the plurality of busses. The arbitration circuit may have a first set of inputs for receiving routing request signals from the plurality of entities. The arbitration circuit may have a first set of outputs for producing acknowledge signals for indicating successful data transfer to the plurality of entities. The arbitration latches may connect to the at least one swapper circuit and to a second set of outputs of the arbitration circuit for supplying routing information from the arbitration circuit to the at least one swapper. The arbitration circuit may include logic circuitry for generating select control signals to the multiplexor and wherein the arbitration latches provide a delay to synchronize data transfer with routing information. A timing circuit for synchronizing data flow into and out of the at least one swapper and the plurality of entities may also be included. The plurality of entities may be a plurality of processors. The acknowledge signals may include data address information. The routing requests may arrive at the arbitration circuit one or more clock cycles before corresponding data to provide a predetermined amount of time to process the routing requests.

A swapper circuit for exchanging data includes a latching circuit connecting to an input for receiving input data and holding the data therein, a pass gate for connecting or disconnecting the input from the latch. The pass gate is activated by a control signal. A tristate circuit connects to the latch for transferring the data to an output when a swap control signal is activated. An inverter may connect to the input for reducing noise outside a normal power range. The tristate circuit may include field effect transistors, a NAND gate and/or a NOR gate. A multiplexor connected to the input may be included.

A bidirectional repeater for tristate busses includes two tristate drivers, each driver having an output connected to an input of the other such that signals are driven in only one direction at a time during a predetermined period of time. Each of the outputs connected to the inputs of the other driver are connected to a first bus and a second bus for decreasing signal delay and removing noise from bus signals. The first bus and the second bus may be connected to a plurality of tristate circuits. The first bus and the second bus may be connected to a plurality of receivers. The tristate to drivers may each be enabled by a separate enable signal.

A method of exchanging data comprising the steps of launching first data from a first entity to a swapper circuit on a first data line, launching second data from a second entity to the swapper circuit on a second data line, receiving the first data on the first data line from the first entity at the swapper circuit, storing the data from the first entity until data from the second entity is received on the second data line of the swapper circuit, and simultaneously sending the first data to the second entity on the second data line and the second data to the first entity on the first data line wherein the first and second data do not collide. The steps of synchronizing the first data transmission and the second data transmission by launching a first timing signal from the first entity and a second timing signal from the second entity, the timing signals to set the swapper circuit in a receive data mode may be included. The steps of synchronizing the first data being received at the second entity and the second data being received at the first entity by launching a first timing signal and a second timing signal from the swapper circuit, the timing signals to set the first and second entities in a receive data mode may be included. The step of storing may comprise providing a latch for receiving and storing the first data. The step of enabling the latch to store data by providing a control signal may be included. The step of providing a tristate circuit in the swapper circuit for passing data, the tristate circuit having a drive state for sending data and a high impedance state for receiving data may also be included. The first and second entities may be a plurality of entities wherein the step of receiving may include the step of multiplexing data from the plurality of entities to the swapper circuit and wherein the step of sending includes simultaneously routing the data to the plurality of entities.

BRIEF DESCRIPTION OF DRAWINGS

The invention will be described in detail in the following description of preferred embodiments with reference to the following figures wherein:

FIG. 2C is a schematic diagram showing a circuit for developing timing signals in the timing bundles;

DETAILED DESCRIPTION OF PREFERRED EMBODIMENTS

The present disclosure describes a data path circuit and method and, more particularly, a circuit for bidirectional data transfer for increasing a bandwidth of information exchanged between a plurality of entities. The circuit for bidirectional data transfer of the present invention is referred to herein as a swapper circuit or a swapper. The swapper provides an orderly time sharing scheme to at least double the bandwidth of information transfer. Two or more entities residing on the same chip or on different chips exchange data each clock cycle. Instead of using two busses for information exchange, a single bus can be segmented, preferably at the physical center of the signal wires, and circuits inserted which route data from a left segmented line to a right segmented line, and vice versa, without having data collide.

Figure 1:
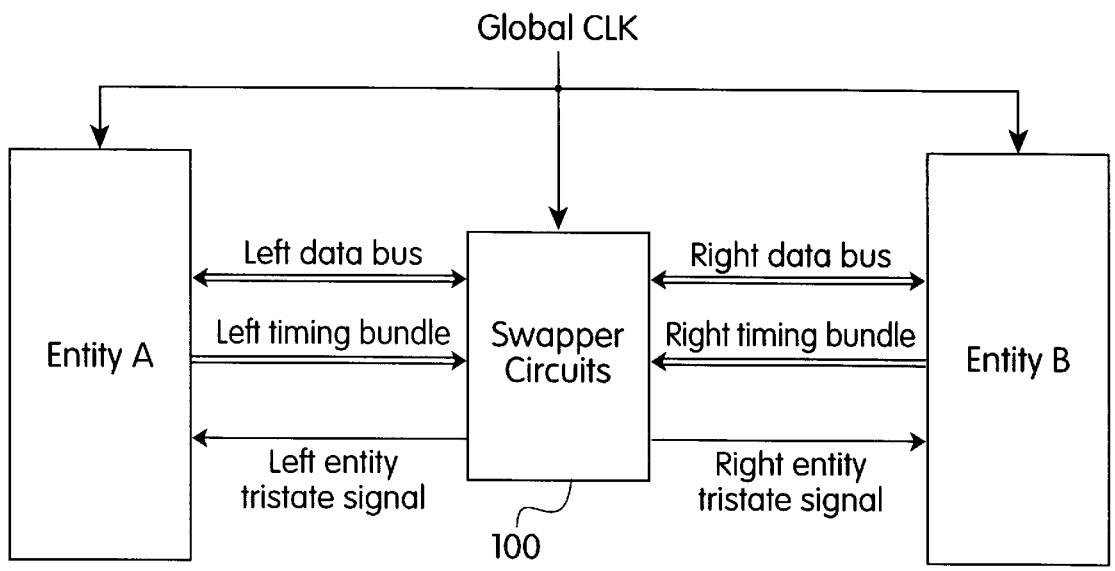
FIG. 1 is a block diagram showing connections between entities and a swapper circuit of the present invention.

Referring now to the drawings in which like numerals represent the same or similar components throughout the many views and initially to FIG. 1, a data path can be traced during a single cycle to illustrate the operation of a swapper circuit 100 of the present invention. At the beginning of a cycle, the data launched from entity A flows through a left data bus, which is physically implemented as a collection of wires. Later in the cycle, entity A data are captured in swapping circuits 100. The data from entity A are held until the data from entity B, following a similar path only right to left, are captured. Once data for both entity A and entity B are held by swapper circuits 100, the data can be exchanged. Entity A data are routed onto right data bus, and likewise entity B data are routed onto left data bus. At the end of the data transfer, entity A receives data from entity B, and likewise B from A, where within each entity, it can be captured and later used in subsequent cycles. Signals travel from right to left and left to right simultaneously. In this way, a doubling of bus bandwidth is achieved. It is further contemplated that a similar scheme may be employed to further increase bandwidth. To facilitate the reliable exchange of data between the entities, entities A and B broadcast timing signals along a left timing bundle and a right timing bundle which are designed to mimic the longest datum path from each entity to swapping circuits 100.

Figure 2A:
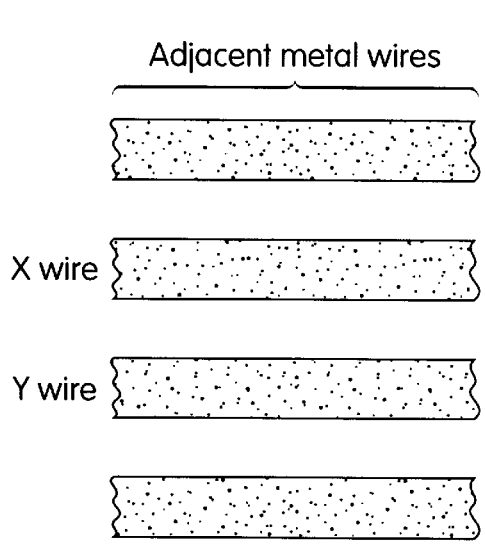
FIG. 2A is a partial top view of bundled timing wires.
Figure 2B:
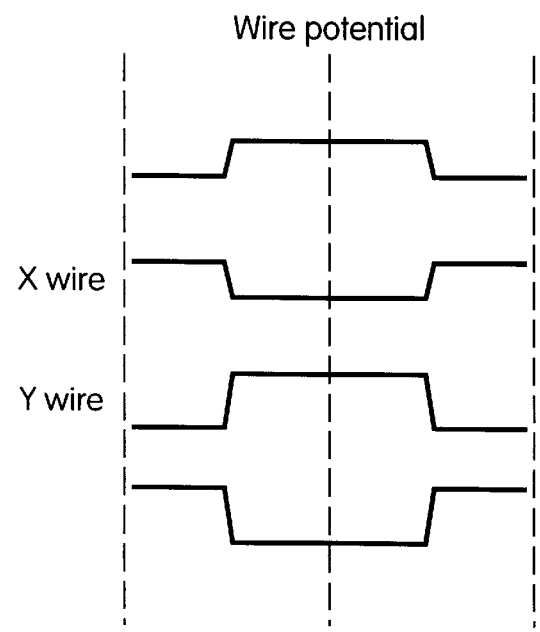
FIG. 2B is a plot of signals that mimic the slowest signals traveling along a an entities timing bundle.

Referring to FIG. 2A, a timing bundle consists of at least four adjacent wires. The wires are arranged such that the two internal wires see worst case coupling from adjacent signal lines. In each data transfer, adjacent timing signals move in opposite directions. Negative coupling from the nearest neighbor wires retards signal propagation. FIG. 2B shows how the signals may be generated within each entity, A and/or B. Referring to FIG. 2C, tristate drivers 254 through 257 send data to swapper circuits 100 from an entity. Tristate drivers 254 through 257 which are devoted to timing are always active since the timing bundles are unidirectional. A latch 251 in combination with an invertor 250 generates a "0""1""0". . . pattern. The triggering of latch 251 is synchronized with the launch of data out of each entity, A and/or B. A latch 253 and an invertor 252 work in a similar manner however a "1""0""1". . . pattern is used.

Figure 3:
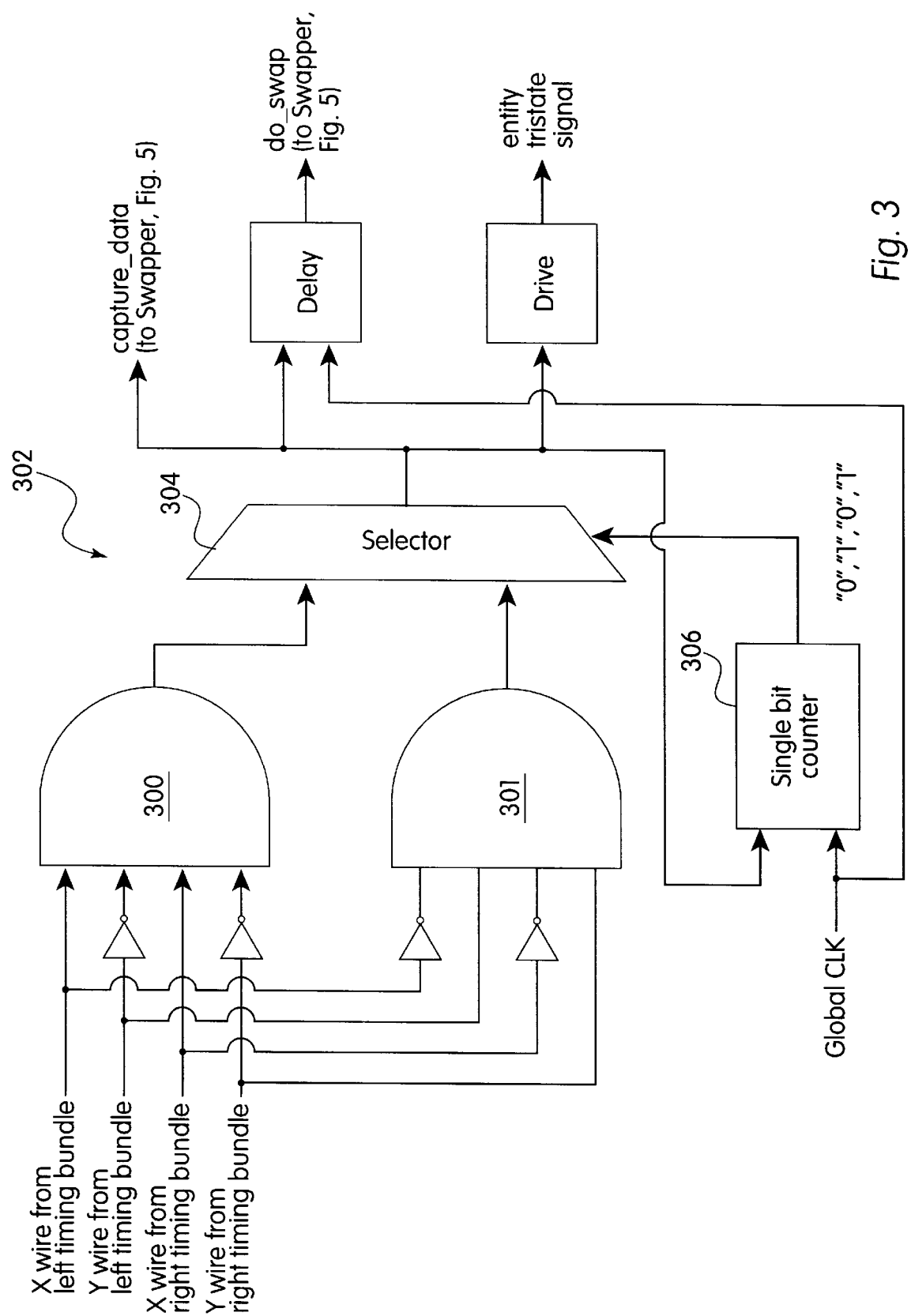
FIG. 3 is a schematic diagram of an asynchronous timing circuit that manages the exchange of data between bus segments.

Referring to FIG. 3, internal wires of left and right timing bundles drive a timing circuit 302. Left and right timing bundles synchronize an orderly transfer of data from left data bus to right data bus and vice versa (FIG. 1). AND gates 300 and 301 determine when the data from left data bus and right data bus arrive. Since the polarity of the timing signals alternates each cycle, a selector 304, controlled by a single bit counter 306, chooses the appropriate transition detector, or AND gate 300 or 301, for that cycle. Each gate 300 or 301 transfer the output of the single bit counter 306 which alternates between "0" and "1". Depending on the physical positioning of swapper circuit 100 (FIG. 1), only one timing bundle may be necessary.

A rising selector output triggers three actions. First, a "tristate_signal" is transmitted to entities A and B where it eventually tristates the entity circuits driving the left and right data bus. Next, a "capture_data" signal causes data from left and right data busses to be latched in the swapper circuits 100 (FIG. 1). Meanwhile, a "do_swap" signal activates swapper drivers 308 which complete the exchange of data between left and right data busses. Entity A data proceeds along the right data bus to entity B. Likewise entity B data proceeds along left data bus to entity A.

Figure 4:
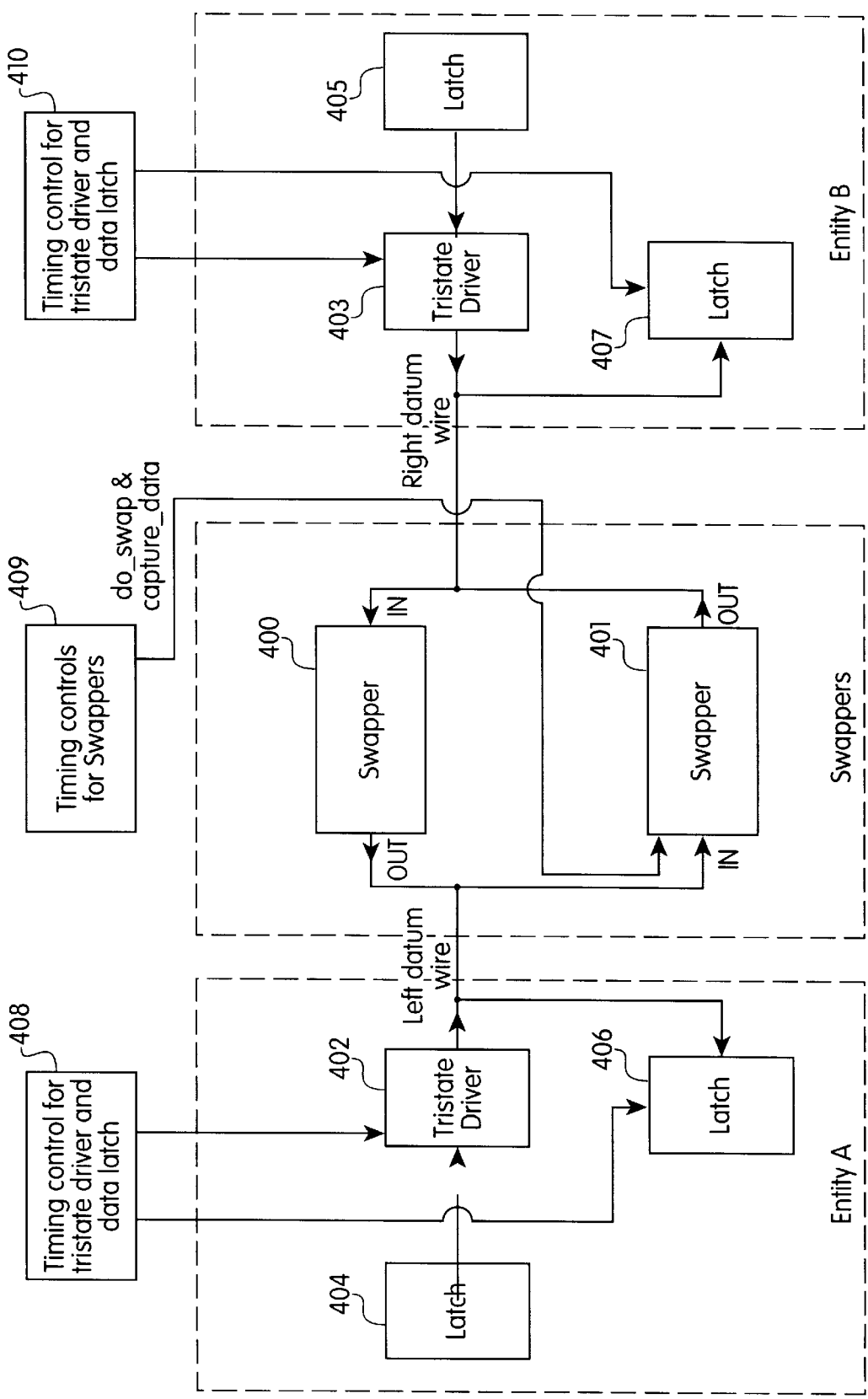
FIG. 4 is a schematic diagram showing a bit slice of the swapper and entity tristate circuits.

Referring to FIG. 4, a single bit slice through entity A, swapper circuits 100, and entity B are depicted. Swappers 400 and 401 are composed of a latching input circuit and a tristate output circuit. The "IN" port of swapper 400 is attached to a right datum wire. Swapper 400 captures a bit of data, on the right datum wire, through its "IN" port in the first half of the data transfer. In the second half of the data transfer, the bit is driven out through the "OUT" port onto the left datum wire. Swapper 401 performs this operation simultaneously only the bit flows in the opposite direction. This process swaps bits residing initially on the left and right datum wires. To achieve robust operation, the "IN" port of the swapper must be disabled, and transfer bit latched, before the "OUT" port can be activated to drive the left or right datum wires. Furthermore, tristate drivers of entities A and B, 402 and 403, are active at the beginning of the data transfer during the time when the swapper latches are in a listening mode and swapper tristate outputs are in a high impedance state. Tristate drivers 402 and 403 switch from active mode to high impedance mode depending on whether the entity A or B is sending information to or receiving information from swapper circuits 100. At any time, only one tristate driver and one latch receiver are active on each wire net for bit transmission across that wire net. The data flow initially is from entity to swapper and then reverses itself once bits have been swapped. Timing signals which coordinate tristate bus operation will be described after the circuits internal to each swapper.

Figure 5:
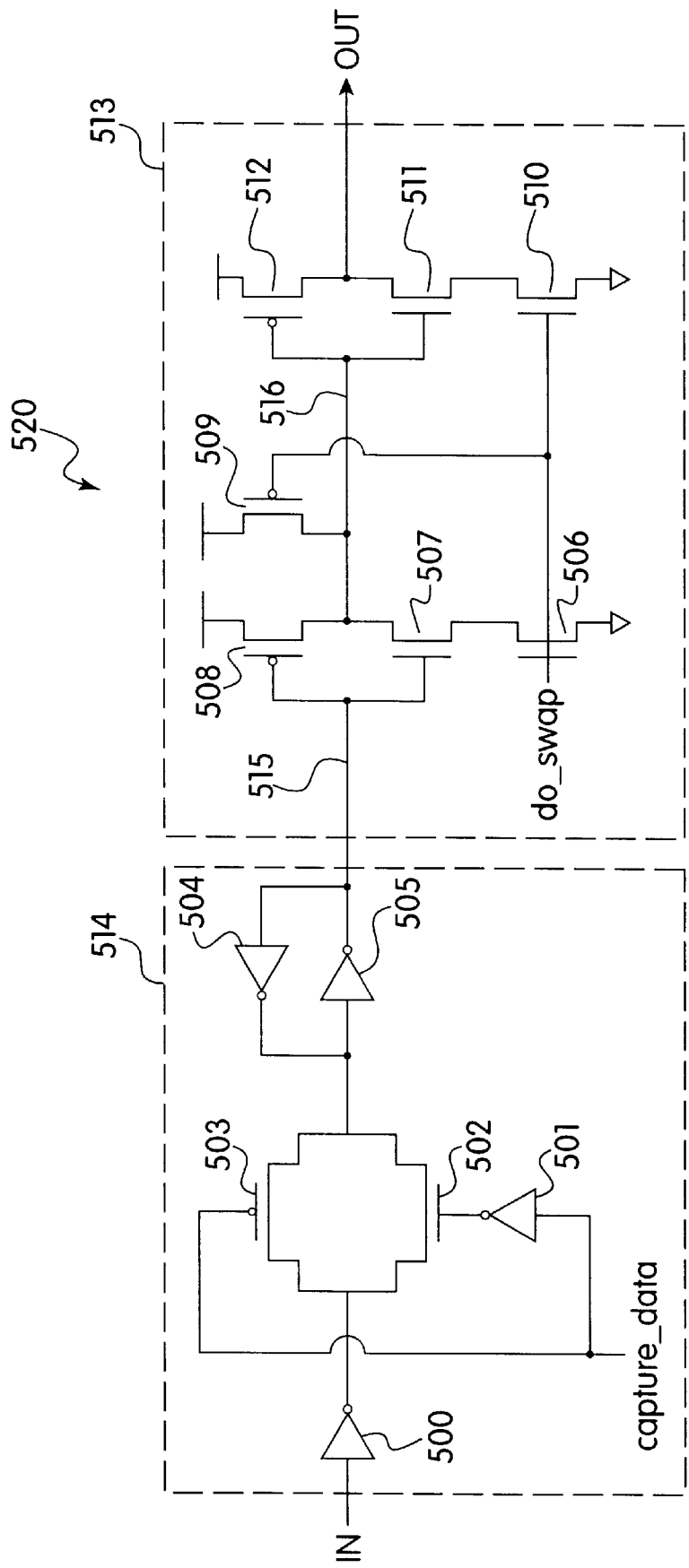
FIG. 5 is a schematic diagram of a swapper circuit.

Referring to FIG. 5, an embodiment of a swapper 520 is shown. A latching section 514 of swapper circuit 520 includes transistors 502 and 503. Invertors 504 and 505 form a latch which holds the data bit being transferred. PFET 503 and NFET 502 are configured as a pass gate which either transfers a bit from the input to the latch or disconnects the input from the latch. An invertor 500 is added as a safety feature to ensure coupled noise on the external bus, outside the normal power supply range, does not penetrate through the pass transistors, 503 and 502, and flip the latch. A tristate section 513 of swapper circuit 520 may include many components. When the "do_swap" signal is asserted, PFET 509 is off, and NFETs 506 and 510 are conducting. Furthermore, PFET 508 in combination with NFET 507 function as an invertor as do the combination of PFET 512 and NFET 511. In the active mode, FETs 506 through 512 of tristate section 513 act like a buffer driving the signal on a node 515 through to the output, "OUT". When the "do_swap" signal is deactivated, the output of tristate section 513 goes into a high impedance state. A node 516 is high, regardless of the state of node 515, which in turn shuts off PFET 512. NFET 510 is also off since the "do_swap" signal is low, and thus NFET 510 blocks the flow of current through NFET 511 to ground. Therefore when "do_swap" signal is deactivated, the output, "OUT", of 513 is in a high impedance state.

Figures 6, 6A:
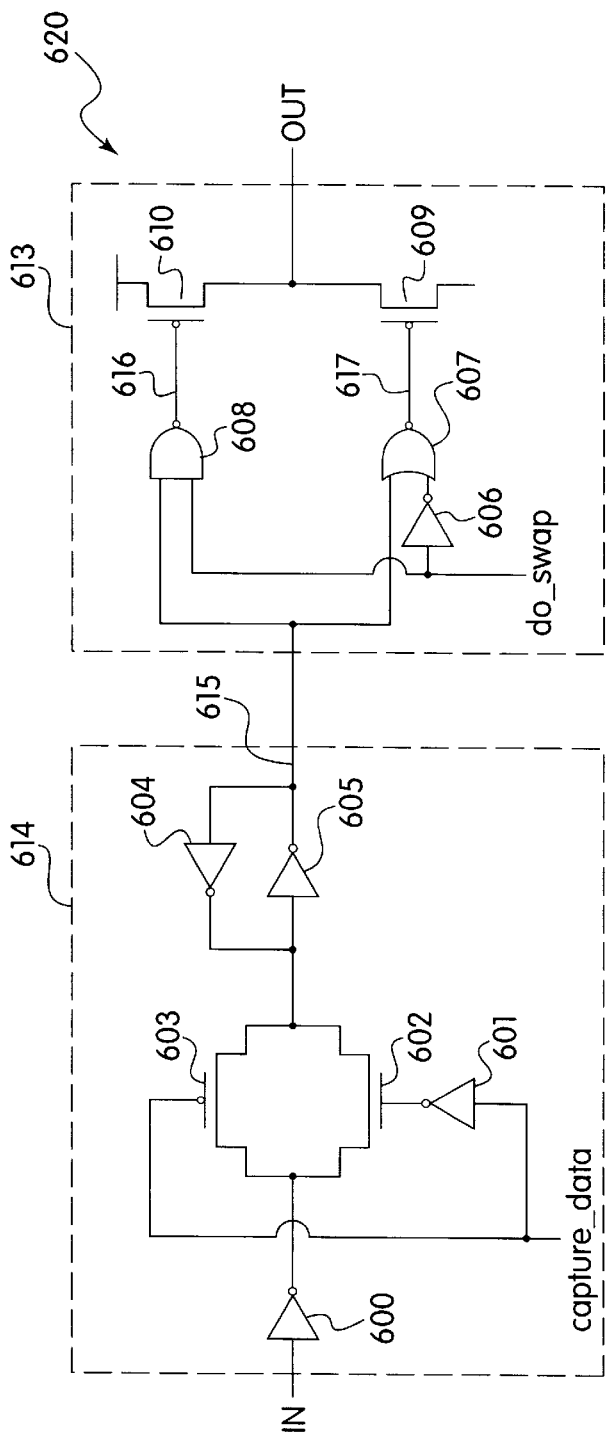
FIG. 6 is a schematic diagram of an alternative embodiment of the swapper circuit shown in FIG. 5.
FIG. 6A is a truth table for the swapper circuit of FIG. 6.

Referring to FIG. 6, another embodiment a swapper 620 is shown. Swapper 620 includes a latching section, 614, and a tristate section, 613. NAND 608 and NOR 607 combine the data signal, stored on node 615, with the "do_swap" signal to enable tristate operation described by the truth table in FIG. 6A. Swapper 520 of FIG. 5 and swapper 620 of FIG. 6 perform the latching and tristate function required to successfully swap data on the left and right datum wires (FIG. 4). One additional feature of the swapper circuit can be to provide signal gain like a repeater.

Figure 7:
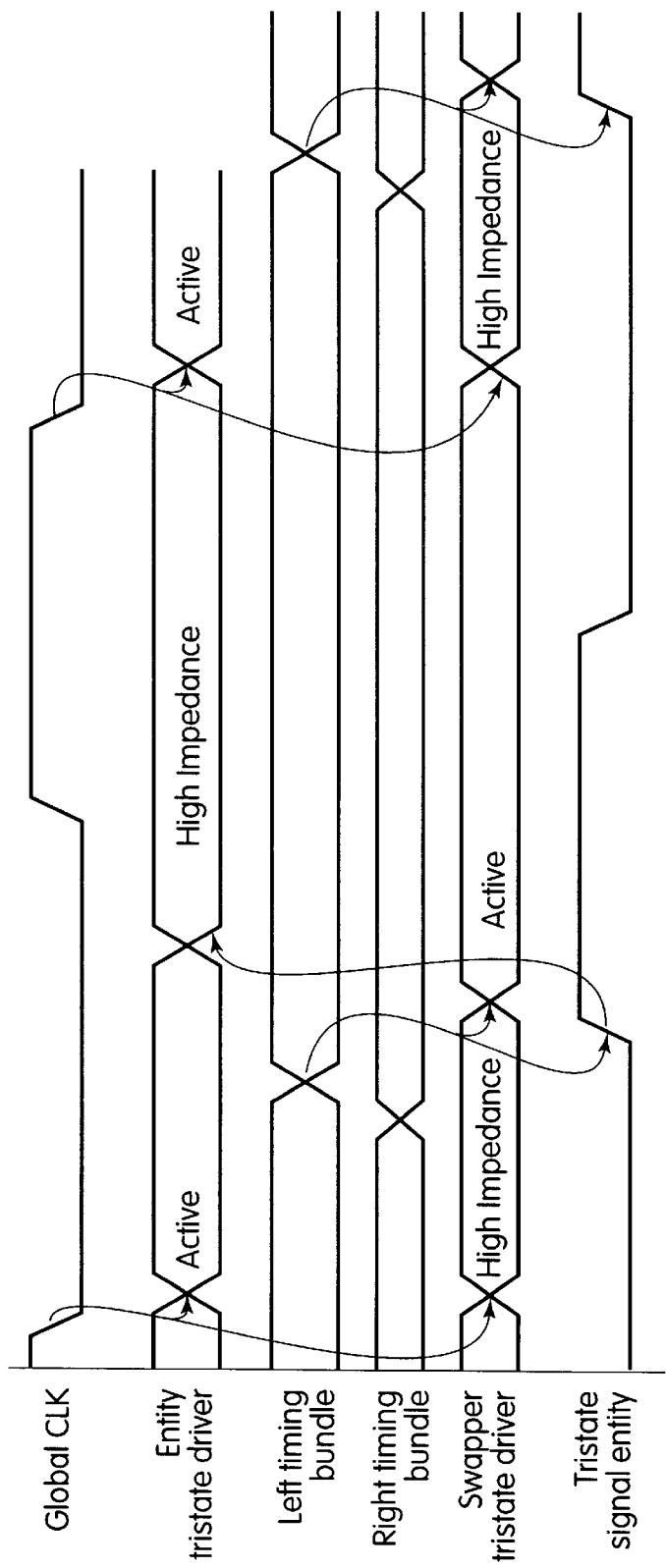
FIG. 7 is a timing diagram for the swapper circuit and processor tristate circuits of FIG. 1.

Referring to FIGS. 1 and 7, a timing diagram for the swapper circuits 100 of FIG. 1 is shown. For simplicity, an asynchronous swapper circuit 100 operates in synchronization with the falling edge of a global clock. The falling global clock enables processor tristate driver and disables swapper tristate driver. The left (right) timing bundle mimics the flow of information from the processor through the left (right) data bus to the swapper. Once both the left and right timing bundles become valid at the swapper, the central swapper's clocking circuitry, as shown in FIG. 3, triggers the capture of the left and right bus data and shortly after drives the data captured in the latches onto the opposite bus. In FIG. 7, the capture and transfer of data is indicated by the swapper tristate driver becoming active. The entity tristate signal is a return signal intended to deactivate an entity's tristate driver before the data launched from swapper 100 arrives at that entity, i.e A or B. Even though entity A and/or B and swapper drivers are active simultaneously, the RC delay along the bus provides the necessary timing buffer to prevent a "tug-of-war" between the two drivers.

Figure 8:
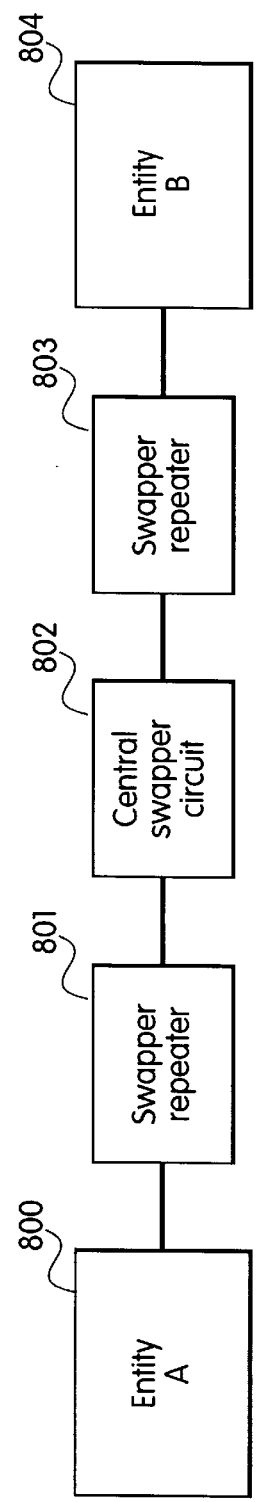
FIG. 8 is a block diagram showing swapper repeaters included into the circuit of FIG. 1.

Referring to FIG. 8, swapper repeaters 801 and 803 are inserted between entity A and swapper circuit 100 and between entity B and swapper circuit 100 (FIG. 1), respectively. Swapper repeaters 801 and 803 are bidirectional repeaters. Swapper repeaters 801 and 803 are inserted in long wires to decrease signal delay through the wires and to restore signal levels by removing noise (coupling, etc.) introduced in transit.

Figure 9A:
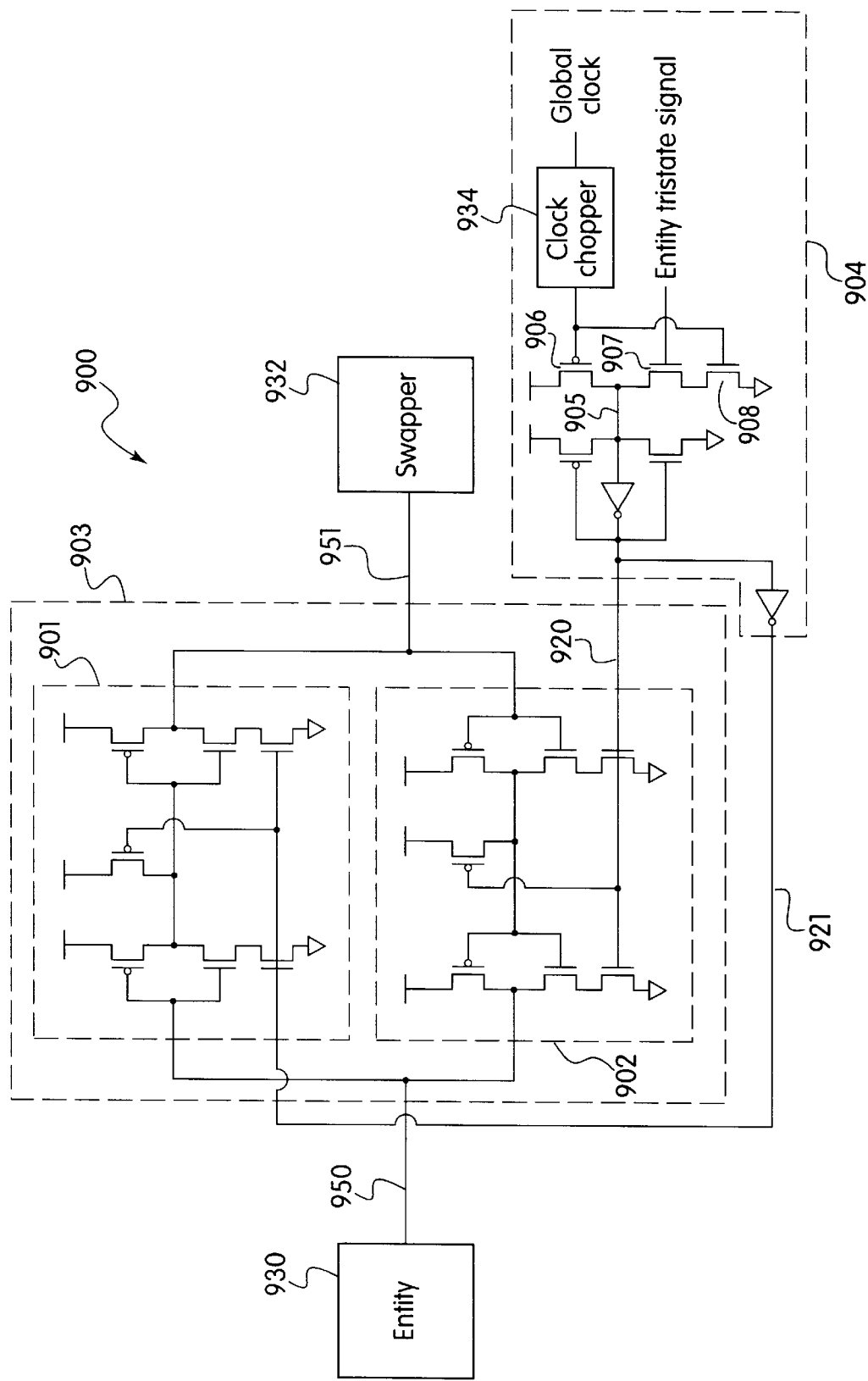
FIG. 9A is a schematic diagram of a swapper repeater and its dedicated timing circuitry.

Referring to FIG. 9A, clocking circuitry and internal components of a swapper repeater 903 are shown. Swapper repeater 903 consists of two tristate drivers 901 and 902 which drive signals in opposite directions. Tristate driver 901 is active when an entity 930 drives a swapper 932 and disabled when swapper 932 drives entity 930. Tristate driver 902 is active when swapper 932 drives entity 930 and disabled when entity 930 drives swapper 932. Tristate drivers 901 and 902 are switched, enabled and disabled, only when input and outputs attached to wires 950 and 951 are equal. This timing assures tristate driver, either 901 or 902, readiness to redrive the datum signal, in the appropriate direction, when the datum signal arrives at swapper repeater 903. Timing circuit 904 controls the enabling and disabling of tristate driver circuits 901 and 902. At the beginning of the cycle, a chopped version of a clock signal created by a clock chopper 934 drives a PFET 906 to preset node 905 high. This action, in turn, drives a node 920 low which disables tristate driver 902 and causes node 921 to rise thus enabling tristate driver 901. A rising entity tristate signal triggers the reverse action. A node 905 is pulled low through transistors 907 and 908 which causes node 920 to rise and node 921 to fall. Tristate driver 902 is enabled before the datum signal on wire 951 arrives from swapper 932. In summary, the clocking circuitry aligns swapper repeater 903 to assist the information flow from entity 930 to swapper 932 or from swapper 932 to entity 930.

Figure 9B:
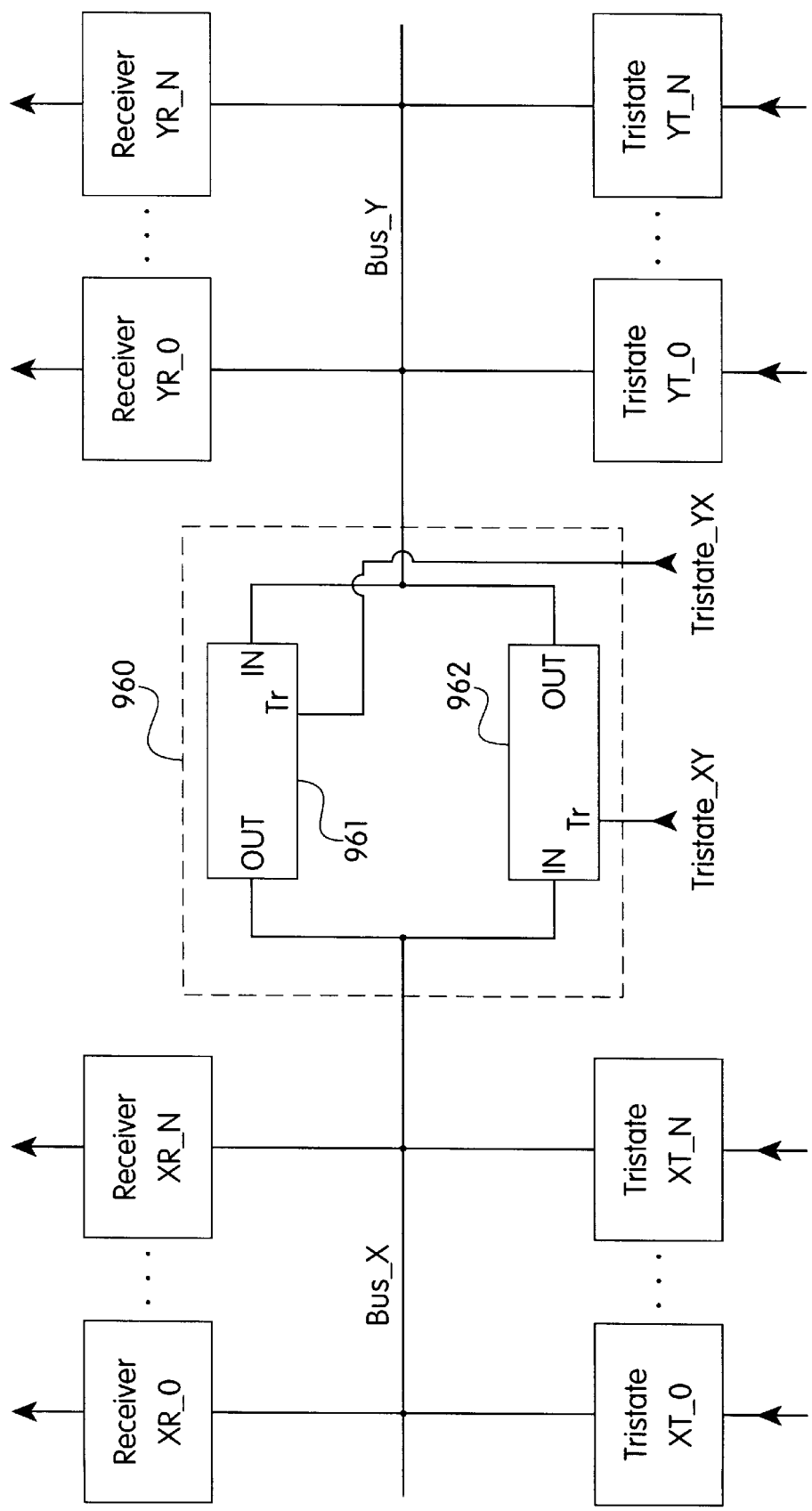
FIG. 9B is a schematic diagram of a swapper repeater for linking tristate busses.

Referring to FIG. 9B, swapper repeater 903 described with reference to FIG. 9A may be employed as a bidirectional repeater 960 to link tristate buses, for example Bus_X and Bus_Y, together. Bidirectional repeater 960 includes two tristate drivers 961 and 962 which drive signals in opposite directions in a similar manner as circuits 901 and 902 in FIG. 9A. Bidirectional repeater has three meaningful exchange modes: 1) When Tristate_XY=1 (or high) and Tristate_YX=0 (or low), tristate circuit 962 is active and tristate 961 is off (in a high impedance state). Data are transferred from Bus_X to Bus_Y. Thus, a single tristate circuit selected from circuits XT_0 through XT_N drives both Bus_X and Bus_Y. 2) When Tristate_XY=0 and Tristate_YX=, tristate circuit 961 is active and tristate circuit 962 is off (in a high impedance state). Data is transferred from Bus_Y to Bus_X. Thus, a single tristate circuit selected from circuits YT_0 through YT_N drives both Bus_X and Bus_Y. 3) When both Tristate_XY and Tristate_YX are 0, bidirectional repeater 960 is disabled. Data may be exchanged independently on Bus_X and Bus_Y. No limitations are placed on receivers XR_0 through XR_N or YR_0 through YR_N.

An asynchronous swapping scheme has been described hereinabove. The asynchronized scheme has an advantage over a swapper being synchronized with a global clock. The advantage is that it reduces the information transfer latency. However, there are some significant advantages of using the midcycle edge of the global clock, Global CLK in FIG. 3, to trigger the swapper and set the driving direction for the swapper repeaters. First, the design complexity is reduced since entity tristate timing signals, timing bundles, and clock circuitry can be simplified or removed. Second, a globally controlled clock can always be expanded to ensure data arrives at the swapper before the swapper is activated. Whereas in the asynchronous timing case, a controlled race occurs between the timing bundles and the data. If the signal in the timing bundle arrives too early, the swapper may be asserted before the data arrives and thus the swapper could malfunction.

Figure 10:
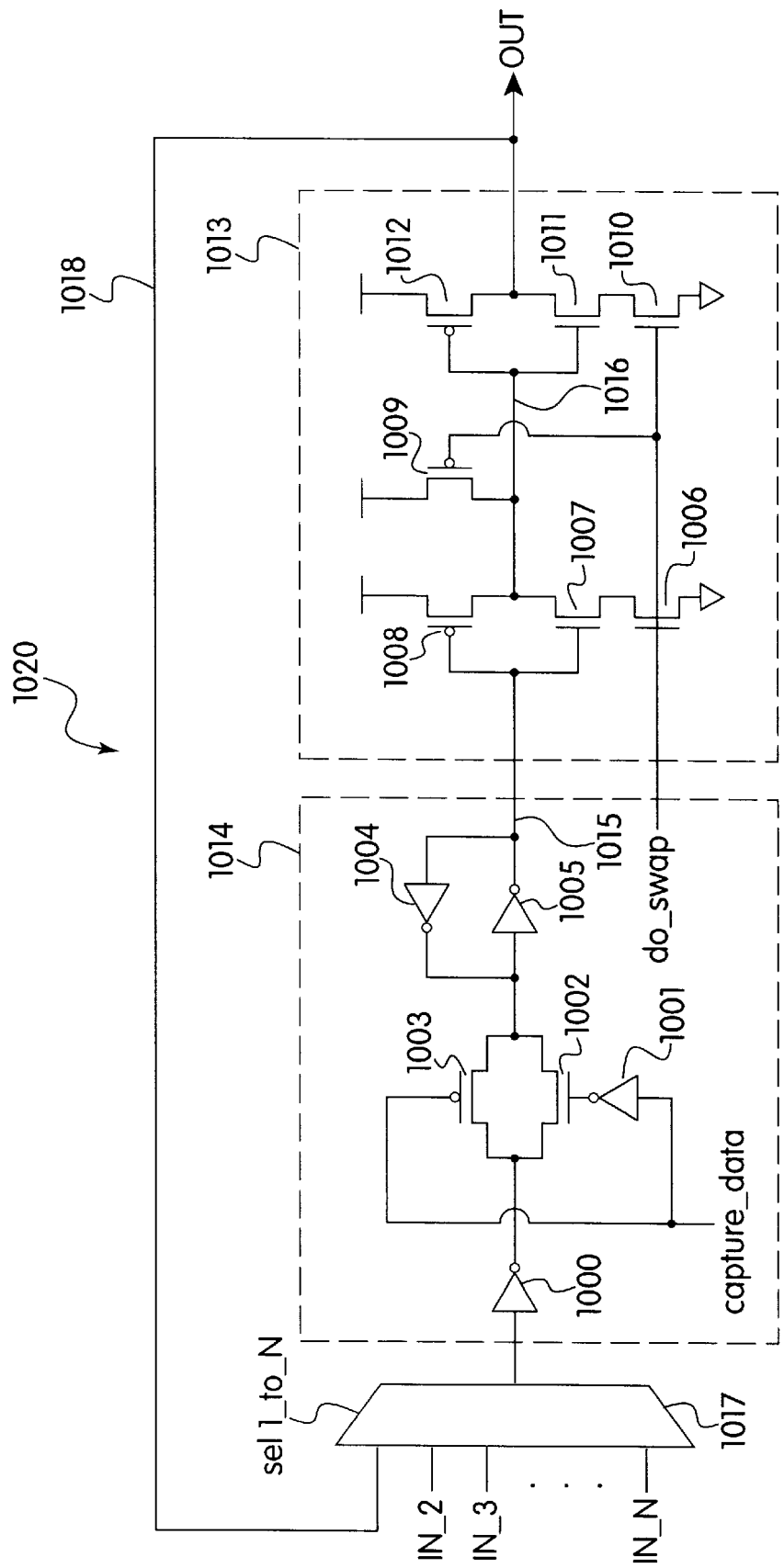
FIG. 10 is a schematic diagram with a swapper circuit having an integrated multiplexor.

Referring now to FIG. 10, an alternate embodiment of a swapper 1020 can be adapted to handle the exchange of data among a plurality of busses. A multiplexor 1017 is illustrated feeding swapper 1020 which works similarly as described with reference to FIG. 5 hereinabove. A feedback net 1018 is provided to reduce power consumption of the swapper if no new information needs to be transfered by swapper 1020 in a given transfer cycle. Data inputs to multiplexor 1017, IN_2 through IN_N, enable swapper 1020 or swappers (not shown) to shuffle data from one bus to another.

Figure 11:
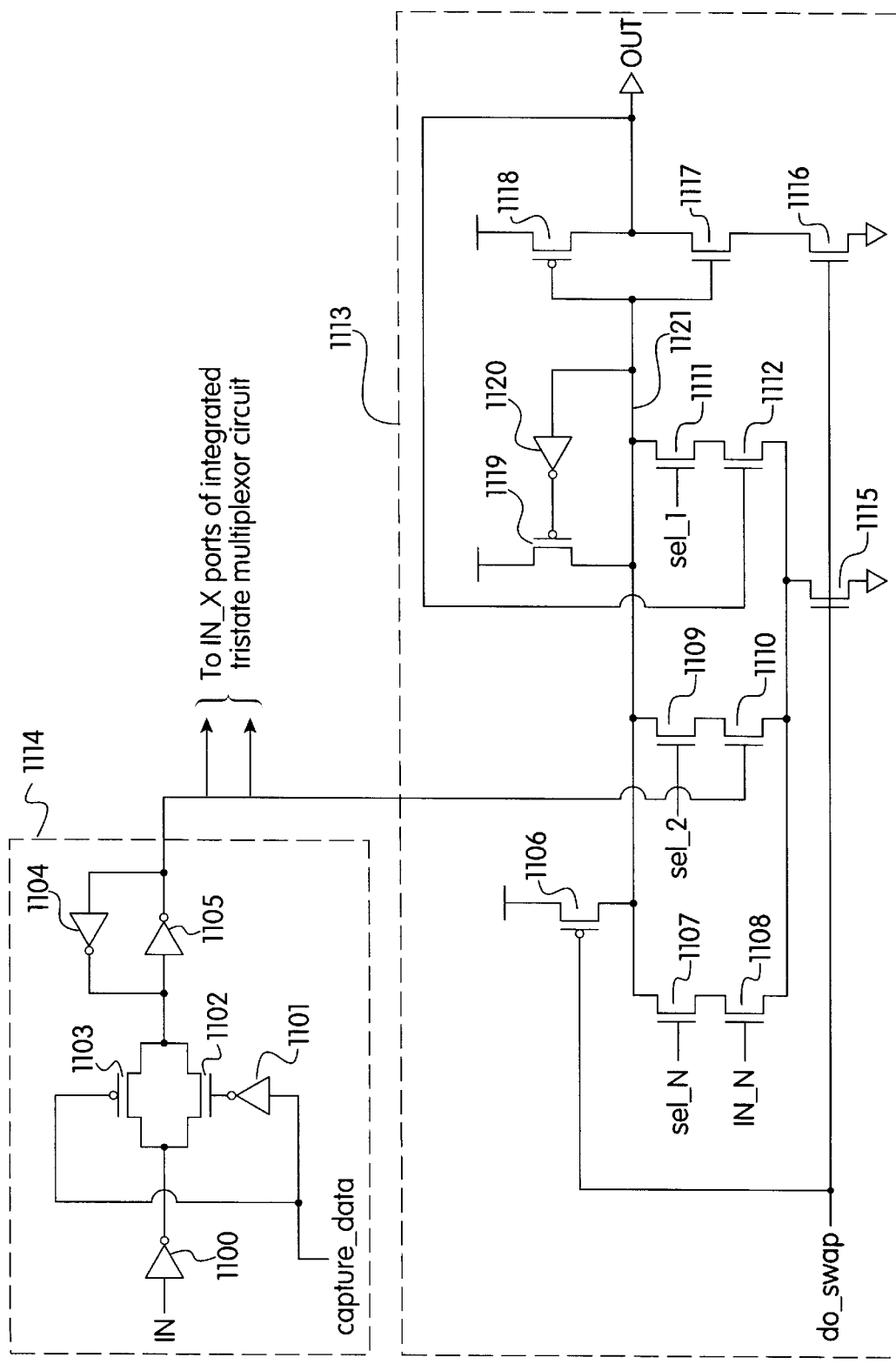
FIG. 11 is a schematic diagram of an alternate embodiment of the swapper circuit with integrated multiplexor shown in FIG. 10.

Referring to FIG. 11, an alternate embodiment of the swapper 1020 described with reference to FIG. 10 in which a multiplexor 1124 is integrated into a tristate driver circuit 1113. A latch 1114 is used to capture and "hold off" data from the data busses until the data can be sent to multiplexor 1124 (FIG. 10). A domino-style circuit is used to implement its multiplexing function. A plurality of legs of multiplexor 1124 are illustrated, each leg is formed from a double NFET stack: 1107 and 1108, 1109 and 1110, or 1111 and 1112. A single high-active selector input sel_1 through sel_N selects the active multiplexor leg on any given transfer cycle. When the do_swap signal is low, FETs 1106, 1115, and 1116 drive circuit 1113 into a high impedance state. PFET 1106 precharges node 1121 high which disables PFET 1118. A disabled NFET 1116 prevents current flow through NFET 1117 to ground. When the do_swap signal is high, node 1121 either remains high, held by PFET 1119, or is pulled low through an active multiplexor leg. The multiplexor leg is active only when both the sel_N and IN_N signals are high.

Figure 12:
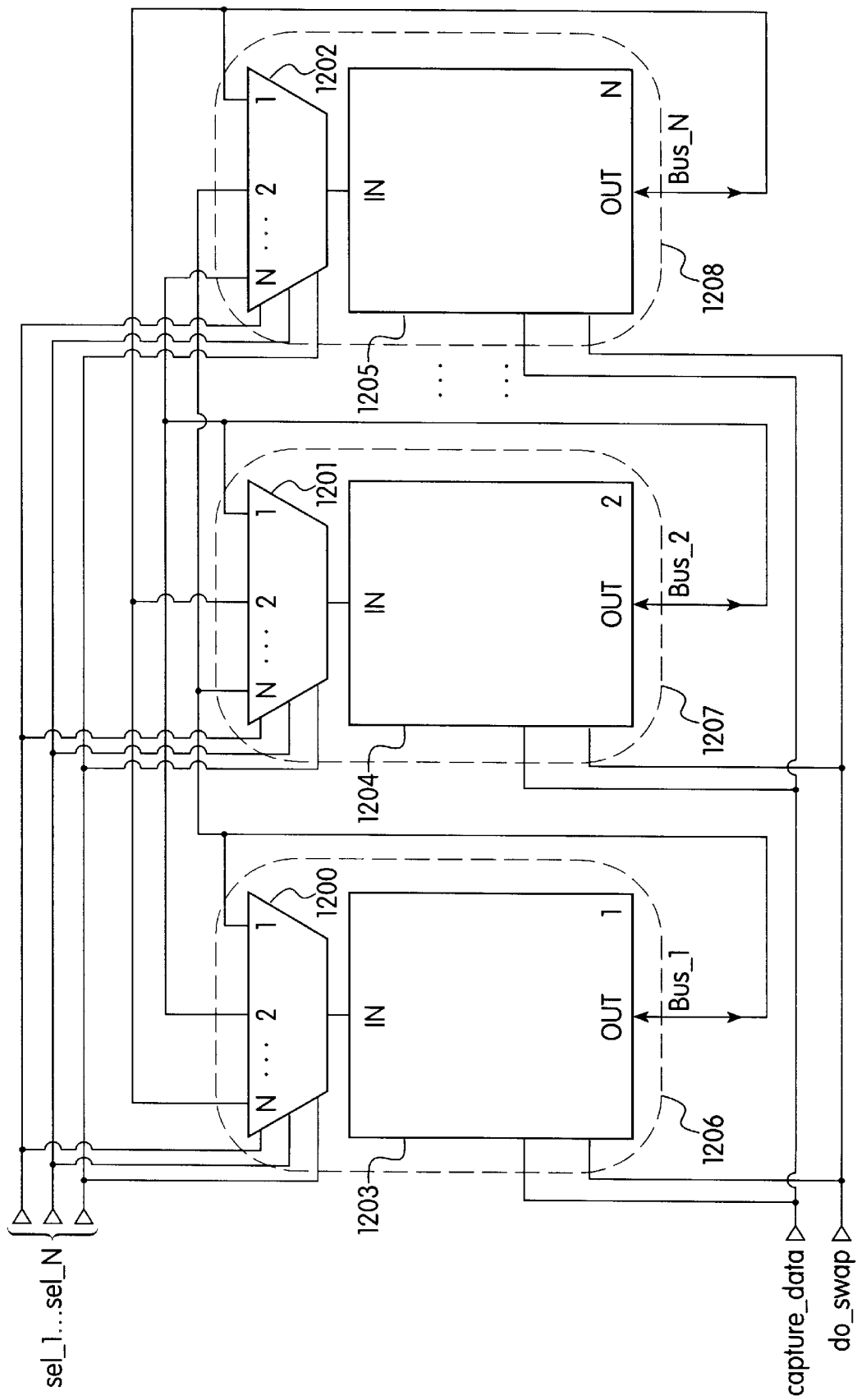
FIG. 12 is a block diagram for an N element swapper embodiment of the swapper circuit with integrated multiplexor of FIG. 10.

Referring to FIG. 12, an N element swapper circuit 1220 is configured to route information between one bus to any other bus. The entities driving each bus are not shown in FIG. 12. A plurality of combination circuits including multiplexor 1017 and swapper 1020 circuits as depicted in FIG. 10 are shown as components 1206, 1207, and 1208. Select inputs, sel_1 through sel_N, control the bus routing each cycle. For example, if Sel_2 is high, a multiplexor 1200 will feed the Bus_2 state into a swapper 1203, a multiplexor 1201 will feed the Bus_N state into a swapper 1204, and a multiplexor 1202 will feed the Bus__1 state into a swapper 1205. Based on the above description with reference to FIG. 12 and referring to FIG. 11, the circuit depicted in FIG. 11 can likewise be assembled into an N element swapper.

Figure 13:
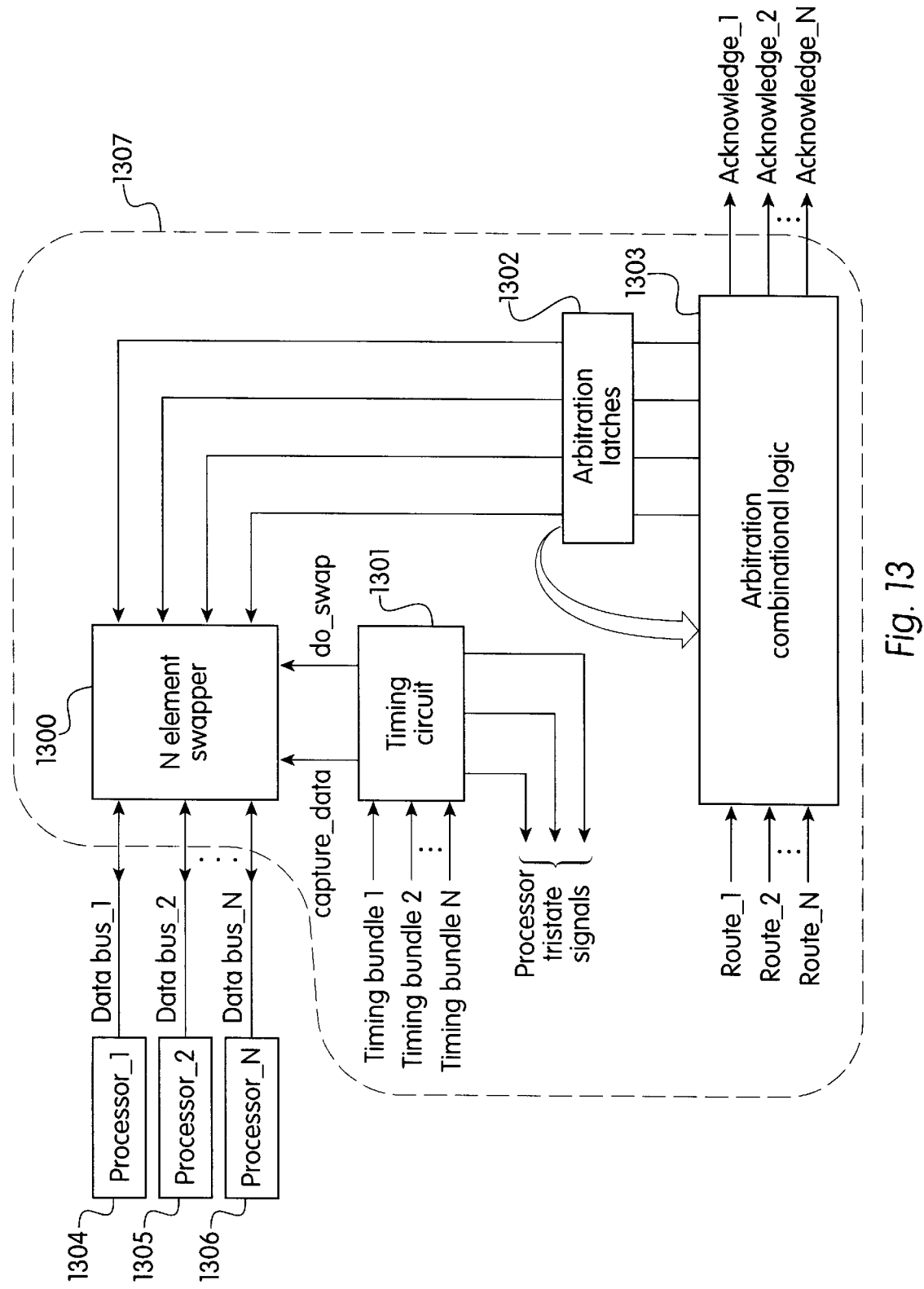
FIG. 13 is a block diagram showing multiple processor entities, an N element swapper, asynchronous timing circuits, and arbitration logic.

FIG. 13 illustrates an N dimensional swapping system 1307. It consists of an N element swapper 1300, a timing circuit 1301, an arbitration circuit 1303, and arbitration latches 1302. The N element swapper 1300 is the physical entity which shuffles or exchanges information among busses. Timing circuit 1301 synchronizes the capture and launch of information into and out of N element swapper 1300. Based upon processor routing requests (signals Route__1 through Route__N), arbitration combinational logic 1303 generates select controls to feed multiplexor 1017 (FIG. 10) of each swapper bit within the N element swapper 1300. Arbitration combinational logic 1303 also generates acknowledgment signals, Acknowledge__1 through Acknowledge__N, to inform entities 1304 through 1306 of the exchange or swapping status. If a specific bus routing is not feasible in one cycle due to a routing conflict from another entity vying for the same bus, the acknowledgement signals inform the entity of the failed exchange so it may rebroadcast the same data. The acknowledge signals may also contain the address of the data being received by the processor, or the address may be encapsulated along with the data. Due to timing constraints, the routing information should probably be driven to the swapper one cycle before the data. The arbitration latches 1302 hold the select signals over the duration of the transfer cycle to align the routing information with the data arriving on the busses, Bus__1 through Bus__N.

Figure 14:
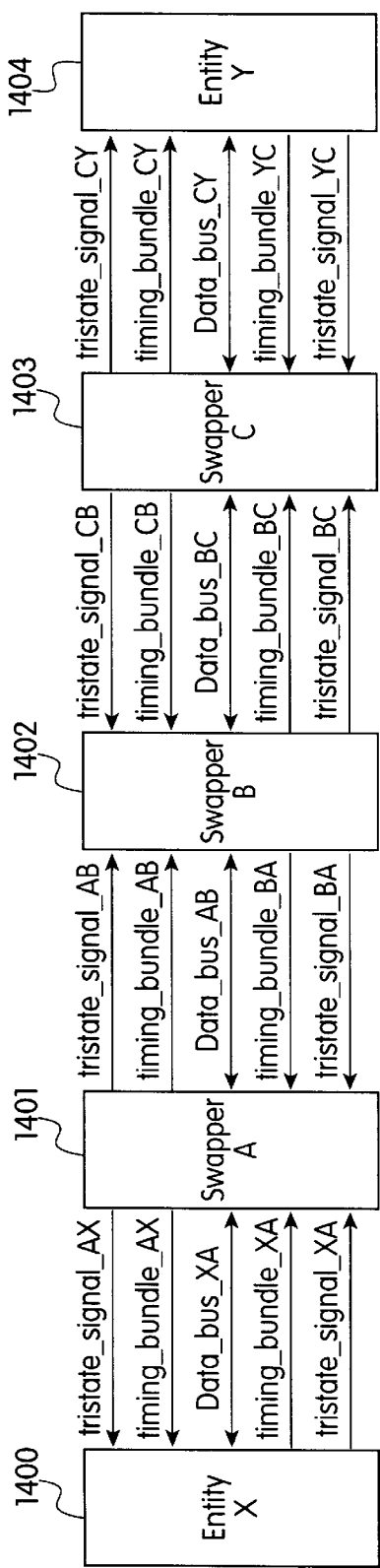
FIG. 14 is a block diagram showing cascaded swappers which increase data bus bandwidth.
Figure 15:
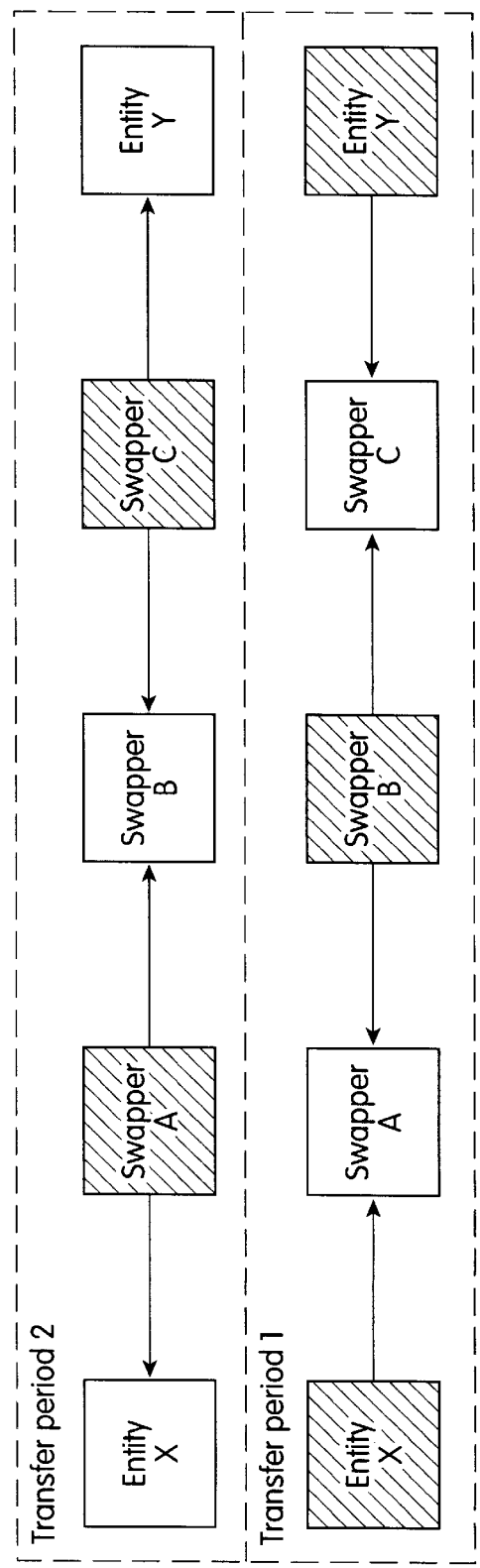
FIG. 15 is an information flow diagram for the cascaded swappers of FIG. 14 operating over a transfer period 1 and a transfer period 2.

Referring to FIG. 14, entities 1400 and 1404 exchange information through the cascaded swappers 1401, 1402, and 1403. The four bidirectional data busses XA, AB, BC, and CY, connecting entities 1400 and 1404 and swappers A, B and C, simultaneously support the exchange of four independent information packets. The unidirectional tristate signals and timing bundles coordinate the robust transfer of data from one entity or swapper to another over the bidirectional busses. Swapper circuits alternate between receiving and driving modes. While in the receiving mode, the drivers of the swapper are in a high impedance state, and the latches of the swapper are in a listening state. When the swapper switches to its driving mode, its latches capture and hold a signal which is then driven onto the opposite data bus. FIG. 15 illustrates how the data flow to an individual swapper reverses from transfer period 1 to transfer period 2. Since the information is exchanged within the swapper, the information flows either right to left, from Entity X to Swapper A, then from Swapper A to Swapper B, then from Swapper B to Swapper C, and finally from Swapper C to Entity Y, or left to right from Entity Y to Swapper C, then from Swapper C to Swapper B, then from Swapper B to Swapper A, and finally from Swapper A to Entity X. Each transfer period, the information advances from one element, either a entity or a swapper, to another over the data bus.

Figure 16:
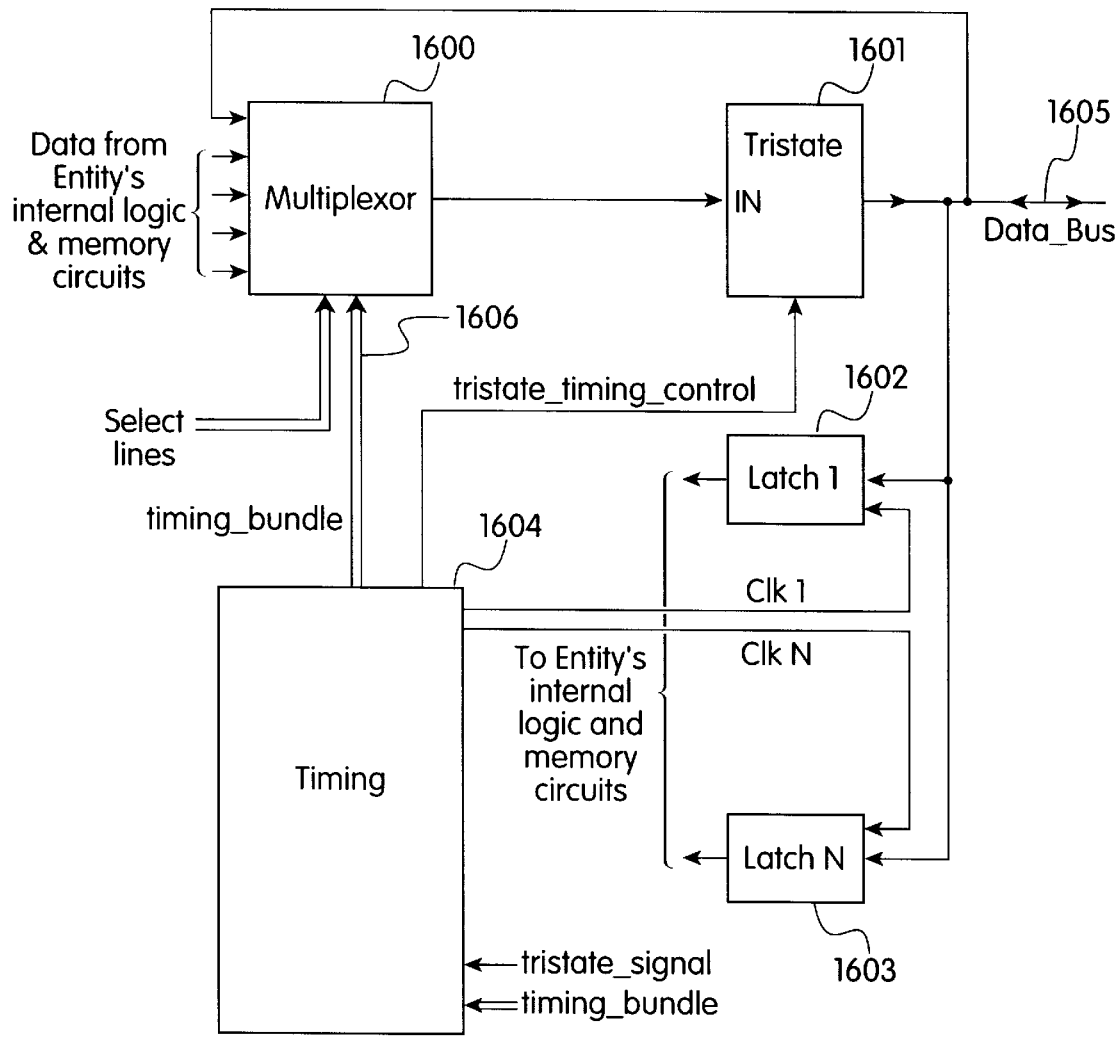
FIG. 16 is a block diagram showing a bitslice of an entity's tristate, latch, timing, and multiplexor circuitry required to feed and capture multiple waves of data going to and coming from swapper circuits during a single system cycle.

FIG. 16 shows a tristate circuit 1601, latches 1602 or 1603, a timing circuit 1604, and a multiplexor 1600 for an entity (processor) for feeding swapper circuits as described hereinabove with multiple waves of information over a given system cycle. Data is either supplied to swappers through the tristate circuit 1601 operating in conjunction with multiplexor 1600 or received from swappers into latches 1602 and 1603. Timing circuit 1604 coordinates the launch or capture of data transmitted through a bidirectional bus 1605. Latches 1602 and 1603, opened and closed by clk1 and clkN respectively, align the data with the entity's internal clocks.

A bidirectional bussing scheme has been described which enables simultaneous transfer of data between two or more entities. A simple system consists of two entities which exchange data through two segmented busses and central swapping circuits. Because the description also references complex swapping implementations like cascaded swappers and multiple input swappers, persons skilled in the art should recognize the inventive principles stated herein apply to even more complex structures, for example, where a collection of multiple input swappers becomes a single element of an N by M matrix, with each element communicating to another through a segmented bus, timing bundles, entity tristate signals, routing signals, and acknowledge signals. Furthermore, while the above embodiments employ circuits which transmit single-ended binary signals, it is not beyond the scope of this invention to conceive of circuits which transmit analog signals, differential signals, or N-state signals (where N=3, 4, etc.). The swapper circuit fundamentally consists of a memory circuit which captures the incoming signals from one wire segment and a multistate circuit, with one of its states being a high impedance state, which transfers the signal onto the other wire segment.

An entire communication network composed of swapper circuits may be implemented on more than one chip and may connect, in a plurality of combinations, data entry entities such as a keyboard, memory entities such as RAM or disk, and logic entities such as a microprocessor or DSP (digital signal processor).

Having described preferred embodiments of a novel bidirectional data (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A circuit for bidirectionally exchanging data comprising:
   a plurality of entities electrically connected therebetween by a bus, the plurality of entities for sending and receiving data to each other;
   an at least one swapper circuit electrically connected to the bus at a connection point between the plurality of entities, the at least one swapper circuit including means for timing data transfer between a send data mode and a receive data mode and sending and receiving data during the respective modes; and
   the at least one swapper circuit including a routing means for receiving data simultaneously from the plurality of entities and then sending data simultaneously to the plurality of entities without colliding data.

2. The circuit for bidirectionally exchanging data as recited in claim 1 further comprising entity timing means for each of the plurality of entities electrically connecting to the at least one swapper circuit for propagating timing signals to the at least one swapper circuit to enable the send data mode and the receive data mode within the at least one swapper circuit to correspond with a receive data mode and a send data mode, respectively, for each entity.

3. The circuit for bidirectionally exchanging data as recited in claim 2 wherein the timing signals are asynchronous and timed by each of the plurality of entities.

4. The circuit for bidirectionally exchanging data as recited in claim 2 wherein the timing means for data transfer and the entity timing means for propagating timing signals are synchronized by a global clock signal provided thereto by a global clock.

5. The circuit for bidirectionally exchanging data as recited in claim 4 wherein the timing signals are propagated on at least four adjacent wires such that each wire has a timing signal opposite in polarity to the wires adjacent thereto and two internal wires have more capacitive coupling than the other wires for representing a slowest signal on the bus.

6. The circuit for bidirectionally exchanging data as recited in claim 1 wherein the at least one swapper circuit is located at a substantially equal distance along the bus from each of the plurality of entities.

7. The circuit for bidirectionally exchanging data as recited in claim 1 wherein the plurality of entities are components on a semiconductor device.

8. The circuit for bidirectionally exchanging data as recited in claim 1 wherein the at least one swapper circuit includes multiple inputs for exchanging data between multiple busses.

9. The circuit for bidirectionally exchanging data as recited in claim 8 wherein an output of the at least one swapper is connected to one of the multiple inputs to turn the at least one swapper circuit off if no data is being transferred.

10. The circuit for bidirectionally exchanging data as recited in claim 1 wherein the at least one swapper includes an at least one tristate driver which is switched between an active mode and a high impedance mode corresponding to the send data mode and the receive data mode of the at least one swapper.

11. The circuit for bidirectionally exchanging data as recited in claim 1 wherein each of the plurality of entities includes a unidirectional tristate driver cooperating with at least one latch and a timing signal generated from a global clock to sequence send data modes and receive data modes by each of the plurality of entities.

12. The circuit for bidirectionally exchanging data as recited in claim 1 wherein the at least one swapper connects to at least one bidirectional repeater for decreasing signal delay and removing noise from the bus.

13. The circuit for bidirectionally exchanging data as recited in claim 12 wherein the at least one bidirectional repeater includes two tristate drivers, each driver having an output connected to an input of the other such that signals are driven in only one direction at a time during a predetermined period of time.

14. The circuit for bidirectionally exchanging data as recited in claim 1 wherein the data are binary signals.

15. The circuit for bidirectionally exchanging data as recited in claim 1 wherein the data are analog signals.

16. The circuit for bidirectionally exchanging data as recited in claim 1 wherein the data are differential signals.

17. The circuit for bidirectionally exchanging data as recited in claim 1 wherein the data are N-state signals.

18. A circuit for bidirectionally exchanging data comprising:
a plurality of entities electrically connected therebetween by a plurality of buses, the plurality of entities for sending and receiving data to each other;
an at least one swapper circuit electrically connected to the bus at a connection point between the plurality of entities, the at least one swapper circuit including means for timing data transfer between a send data mode and a receive data mode;
an at least one multiplexor connecting to the plurality of busses and to the at least one swapper for receiving data from the plurality of entities on one bus and for sending data through another bus to the plurality of entities;
entity timing means for each of the plurality of entities electrically connecting to the at least one swapper circuit for propagating timing signals to the at least one swapper circuit to enable the send data mode and the receive data mode within the at least one swapper circuit to correspond with a receive data mode and a send data mode, respectively, for each entity; and
the at least one swapper circuit including a routing means for receiving data simultaneously from the plurality of entities and then sending data simultaneously to the plurality of entities without colliding data.

19. The circuit for bidirectionally exchanging data as recited in claim 18 wherein the multiplexor includes a plurality of legs, each leg further including a pair of NFETs.

20. The circuit for bidirectionally exchanging data as recited in claim 18 further comprising:
an arbitration circuit electrically connected to arbitration latches for exchanging information among the plurality of busses, the arbitration circuit having a first set of inputs for receiving routing request signals from the plurality of entities, the arbitration circuit having a first set of outputs for producing acknowledge signals for indicating successful data transfer to the plurality of entities;
the arbitration latches connecting to the at least one swapper circuit and to a second set of outputs of the arbitration circuit for supplying routing information from the arbitration circuit to the at least one swapper, the arbitration circuit including logic circuitry for generating select control signals to the multiplexor and wherein the arbitration latches provide a delay to synchronize data transfer with routing information; and
a timing circuit for synchronizing data flow into and out of the at least one swapper and the plurality of entities.

21. The circuit for bidirectionally exchanging data as recited in claim 20 wherein the plurality of entities are a plurality of processors.

22. The circuit for bidirectionally exchanging data as recited in claim 20 wherein the acknowledge signals include data address information.

23. The circuit for bidirectionally exchanging data as recited in claim 20 wherein the routing requests arrive at the arbitration circuit one or more clock cycles before corresponding data to provide a predetermined amount of time to process the routing requests.

24. A method of exchanging data comprising the steps of:
launching first data from a first entity to a swapper circuit on a first data line;
launching second data from a second entity to the swapper circuit on a second data line;
receiving the first data on the first data line from the first entity at the swapper circuit;
storing the data from the first entity until data from the second entity is received on the second data line of the swapper circuit; and
simultaneously sending the first data to the second entity on the second data line and the second data to the first entity on the first data line wherein the first and second data do not collide.

25. The method of exchanging data as recited in claim 24 further comprising the step of:

synchronizing the first data transmission and the second data transmission by launching a first timing signal from the first entity and a second timing signal from the second entity, the timing signals to set the swapper circuit in a receive data mode.

26. The method of exchanging data as recited in claim 24 further comprising the step of:

synchronizing the first data being received at the second entity and the second data being received at the first entity by launching a first timing signal and a second timing signal from the swapper circuit, the timing signals to set the first and second entities in a receive data mode.

27. The method of exchanging data as recited in claim 24 wherein the step of storing comprises providing a latch for receiving and storing the first data.

28. The method of exchanging data as recited in claim 27 further comprising the step of enabling the latch to store data by providing a control signal.

29. The method of exchanging data as recited in claim 24 further comprising the step of providing a tristate circuit in the swapper circuit for passing data, the tristate circuit having a drive state for sending data and a high impedance state for receiving data.

30. The method of exchanging data as recited in claim 24 wherein the first and second entities are a plurality of entities and wherein the step of receiving includes the step of multiplexing data from the plurality of entities to the swapper circuit and wherein the step of sending includes simultaneously routing the data to the plurality of entities.

* * * * *